United States Patent [19]
McNeal

[11] Patent Number: 5,617,072
[45] Date of Patent: Apr. 1, 1997

[54] POSITION SIGNALING APPARATUS

[75] Inventor: Dennis D. McNeal, Las Vegas, Nev.

[73] Assignee: Rockin' Chair Truckers Co., Sugar Land, Tex.

[21] Appl. No.: 354,562

[22] Filed: Dec. 7, 1994

[51] Int. Cl.$^6$ .................................................. G08B 21/00
[52] U.S. Cl. .......................... 340/431; 340/438; 340/686; 340/687; 280/441
[58] Field of Search .................................. 340/431, 440, 340/687, 686, 438; 280/438.1, 441, 441.1

[56] References Cited

U.S. PATENT DOCUMENTS

| | | | |
|---|---|---|---|
| 3,303,457 | 2/1967 | Akesson | 340/686 |
| 3,697,974 | 10/1972 | Harris et al. | 340/275 |
| 4,271,401 | 6/1981 | Meo | 340/687 |
| 4,614,355 | 9/1986 | Koch | 280/438 R |
| 5,108,123 | 4/1992 | Rubenzik | 340/431 |
| 5,314,201 | 5/1994 | Wessels | 280/407 |
| 5,344,173 | 9/1994 | Beeler et al. | 280/438.1 |

*Primary Examiner*—Jeffery Hofsass
*Assistant Examiner*—Daniel J. Wu
*Attorney, Agent, or Firm*—Foster & Foster

[57] ABSTRACT

A position signaling apparatus for indicating desired positioning of vehicle components. The signaling device, including a switch, is mounted to a first vehicle component, such as a tandem axel frame assembly or a portion of the vehicle frame adjacent to the fifth wheel assembly. A trigger mechanism is attached to a second vehicle component. The second vehicle component is adjacent and moves relative to the first vehicle component. The trigger mechanism actuates the switch upon achieving proper alignment of the respect vehicle components. The switch closes a circuit which sends a signal to the vehicle operator upon achieving the desired positioning of the vehicle components.

20 Claims, 9 Drawing Sheets

POSITION SIGNALING APPARATUS

TECHNICAL FIELD

The present invention relates to devices for detecting the position of a moveable component of a vehicle, and more particularly, to devices for signaling relative positioning of multiple components of a vehicle.

BACKGROUND OF THE INVENTION

In the trucking and heavy equipment industry, particularly in the tractor-trailer vehicle industry, loads of various sizes and weights must be handled. Accordingly, various types of trailers and specialized trailing implements have been utilized to handle such loads. Furthermore, vehicle operators must comply with specific laws governing the permissible weight of vehicles that travel on freeways and highways. Typically such laws specify the maximum allowable weight per axel of the vehicle. To facilitate compliance with these laws, the trucking industry has long since developed various adjustable frame components to change the weight distribution on the vehicle axels and bring the vehicle into compliance with weight laws.

Many traditional trailers utilize a tandem axel frame assembly which nests inside the main frame assembly of the trailer. The tandem axel frame assembly is moveable relative to the main frame assembly to change the position of the tandem axels relative to the main trailer frame. Changing the position of the tandem axels varies the distribution of weight on all of the vehicle axels.

Traditional tractor-trailer vehicles also include a carriage assembly on which the fifth wheel of the vehicle is mounted. This carriage assembly allows the fifth wheel to be moved in fore and aft directions relative to the cab portion of the vehicle. Moving the fifth wheel relative to the cab portion also changes the distribution of weight on the various axels of the tractor-trailer vehicle.

Operators of tractor-trailer vehicles must frequently change the position of the trailer tandem axels relative to the trailer frame as well as the position of the fifth wheel relative to the cab to comply with the particular vehicle weight laws. Several changes may be required during a single trip where the load is sequentially reduced. The weight distribution will change for a given amount of movement of the tandem axel or the fifth wheel relative to the other portions of the vehicle. To change the position of the tandem axels of the trailer, a mechanical locking pin which holds the tandem axel frame in place relative to the main trailer frame must be released. The vehicle operator must then enter the cab portion of the vehicle and inch the vehicle forward or backward while maintaining the tandem axels in the same place. The operator while in the cab is required to guess as to how much movement of the vehicle will result in the desired amount of relative frame movement. After making an initial guess, the operator is required to climb out of the vehicle cab to observe the actual amount of frame movement, and then reenter the vehicle cab to make further adjustments. Typically, three to five adjustment attempts are required to achieve the desired positioning.

A similar method is used to adjust the position of the fifth wheel relative to the cab portion of the vehicle. A hand-operated control located inside the cab releases a lock mechanism which secures the fifth wheel in a particular position on a carriage supporting the fifth wheel. The fifth wheel can thereby be moved in a conventional manner in fore and aft directions on the carriage assembly relative to the cab while the lock mechanism is released. Here again, the vehicle operator must guess as to how much the fifth wheel has moved for a given amount of actuation of the hand-operated controls. The operator must climb out of the cab, observe the actual amount of movement, and then return to the cab to make further adjustments. This method also requires typically between three to five adjustment efforts to achieve the desired positioning.

Similar difficulties have likewise persisted with respect to attaching trailers and trailing implements (e.g., boat trailers, campers, house trailers, and the like) to trucks and other vehicles. The aforementioned problems are also encountered when attempts are made to properly position a trailer ball attached to a vehicle under the trailer hitch socket. The driver is required to guess how far the vehicle must be moved to align the ball and socket. Achieving proper alignment typically requires several attempts by the driver, with a need to leave the driver's seat of the vehicle each time an adjustment is made to determine the position of the ball relative to the socket. This process is tedious and time consuming.

Accordingly, there is a need for a device to assist vehicle operators, including but not limited to tractor-trailer vehicle operators, in adjusting the relative position of vehicle components. Specifically, with respect to movement of a fifth wheel assembly relative to the cab portion of the vehicle to change the distribution of weight on the vehicle axels. In addition, there is a need to provide a device to assist tractor-trailer operators in changing the position of the trailer tandem axel frame assembly relative to the main trailer frame to change the distribution of weight on the vehicle axels. Still further, there is a need to develop a device that assists vehicle operators in positioning a ball attached to a vehicle underneath a socket portion of a trailer hitch for attaching the trailer to the vehicle.

OBJECTS AND SUMMARY OF THE INVENTION

It is a primary object of the present invention to provide a device for sending a signal to a vehicle operator inside a cab portion of the vehicle the moment at which two vehicle components are positioned at desired locations relative to one another.

Another object of the invention is to provide a method of positioning vehicle components relative to one another and sending a signal to the vehicle operator inside the cab portion of the vehicle that proper positioning has been achieved.

Still another object of the invention is to provide a signaling device that enables a vehicle operator, while remaining inside a cab portion of the vehicle, to change the position of a tandem axel frame assembly relative to a main trailer frame and receive a signal at the precise moment when the desired position has been achieved.

Yet another object of the invention is to provide a signaling device that enables a vehicle operator, while remaining inside the cab portion of the vehicle, to change the position of a fifth wheel assembly relative to a the cab portion of the vehicle and receive a signal at the precise moment when the desired position has been achieved.

Another object of the invention is to enable the vehicle operator to change the position of tandem vehicle axels to a known, desired new position in order to vary the weight distribution on the axels while the operator remains in the cab of vehicle.

3

Another object of the invention is to provide a signaling device for indicating relative positions of vehicle components to enable the vehicle operator to quickly and efficiently effect a change of vehicle component positions.

Still another object of the invention is to provide a signaling device for indicating relative positions of vehicle components that is easy for a vehicle operator to implement.

Another object of the invention is to provide a method of changing relative positions of vehicle frame components that can be implemented solely by the vehicle operator without assistance from others.

The foregoing objects are achieved by the present invention, which comprises a position signaling apparatus for indicating desired positioning of vehicle components. The signaling device, including a switch, is mounted to an external frame component, such as a tandem axle frame assembly or a portion of the vehicle frame adjacent to the fifth wheel assembly. A trigger mechanism is attached to a portion of the vehicle that moves relative to the component to which the signaling device is mounted. The trigger actuates the switch upon achieving desired positioning of the respect vehicle components. The switch closes a circuit to send a signal to the vehicle operator located inside the vehicle cab at the precise moment desired positioning is achieved. Other objects, features, and advantages of the invention will become apparent from the following detailed description of the invention with reference to the drawings.

BRIEF DESCRIPTION OF THE DRAWINGS

Preferred embodiments of the invention are described below with reference to the accompanying drawings.

DETAILED DESCRIPTION OF THE PREFERRED EMBODIMENTS

The present invention comprises generally an alignment or position signaling apparatus 20 (e.g. FIGS. 1 and 2) used for indicating relative positions of frame components of vehicles, including but not limited to tractor-trailer vehicles in the trucking industry.

Figure 1:
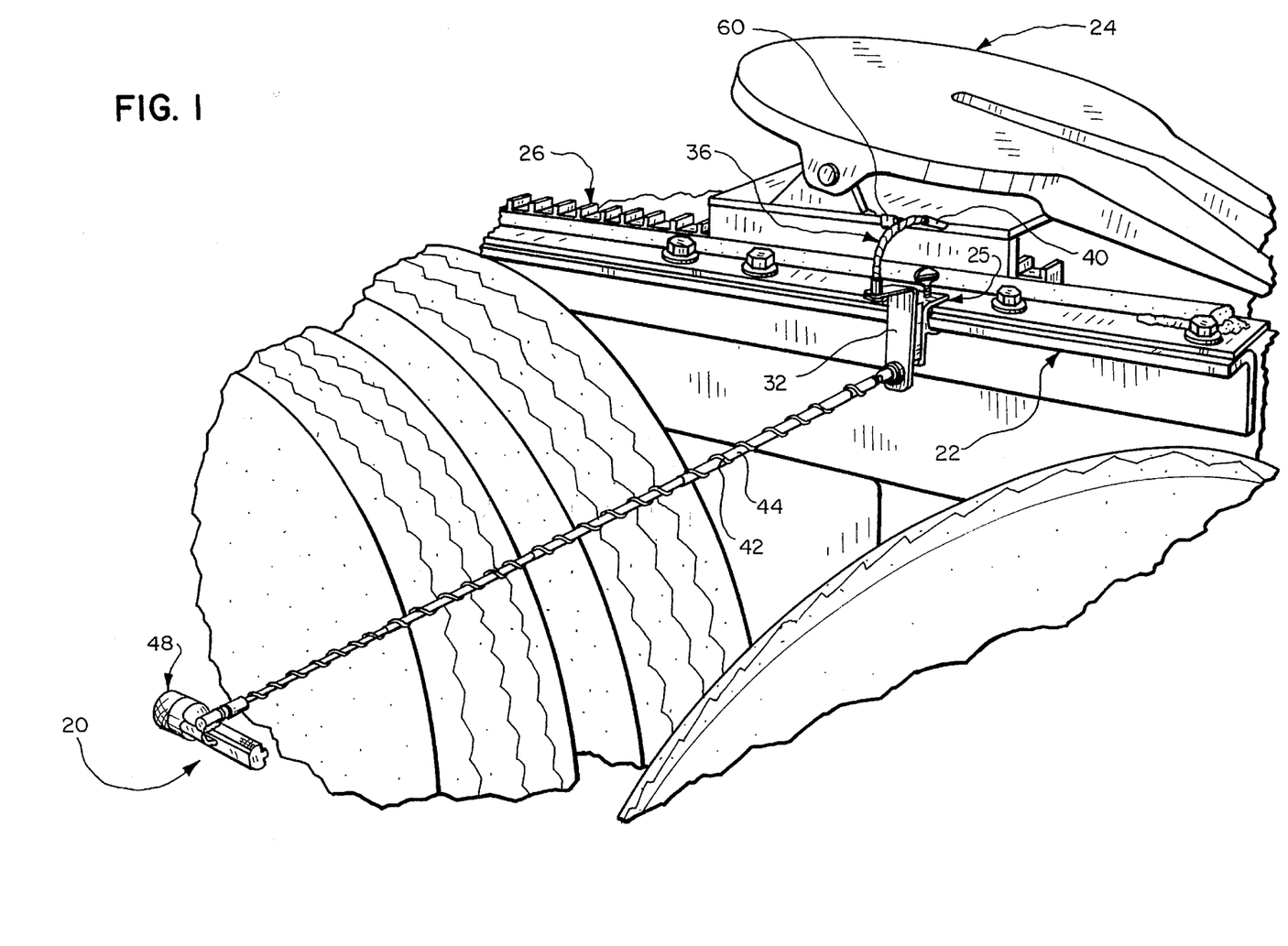
FIG. 1 is an isometric view of a position signaling apparatus according to the present invention mounted to a tractor-trailer vehicle.
Figure 2:
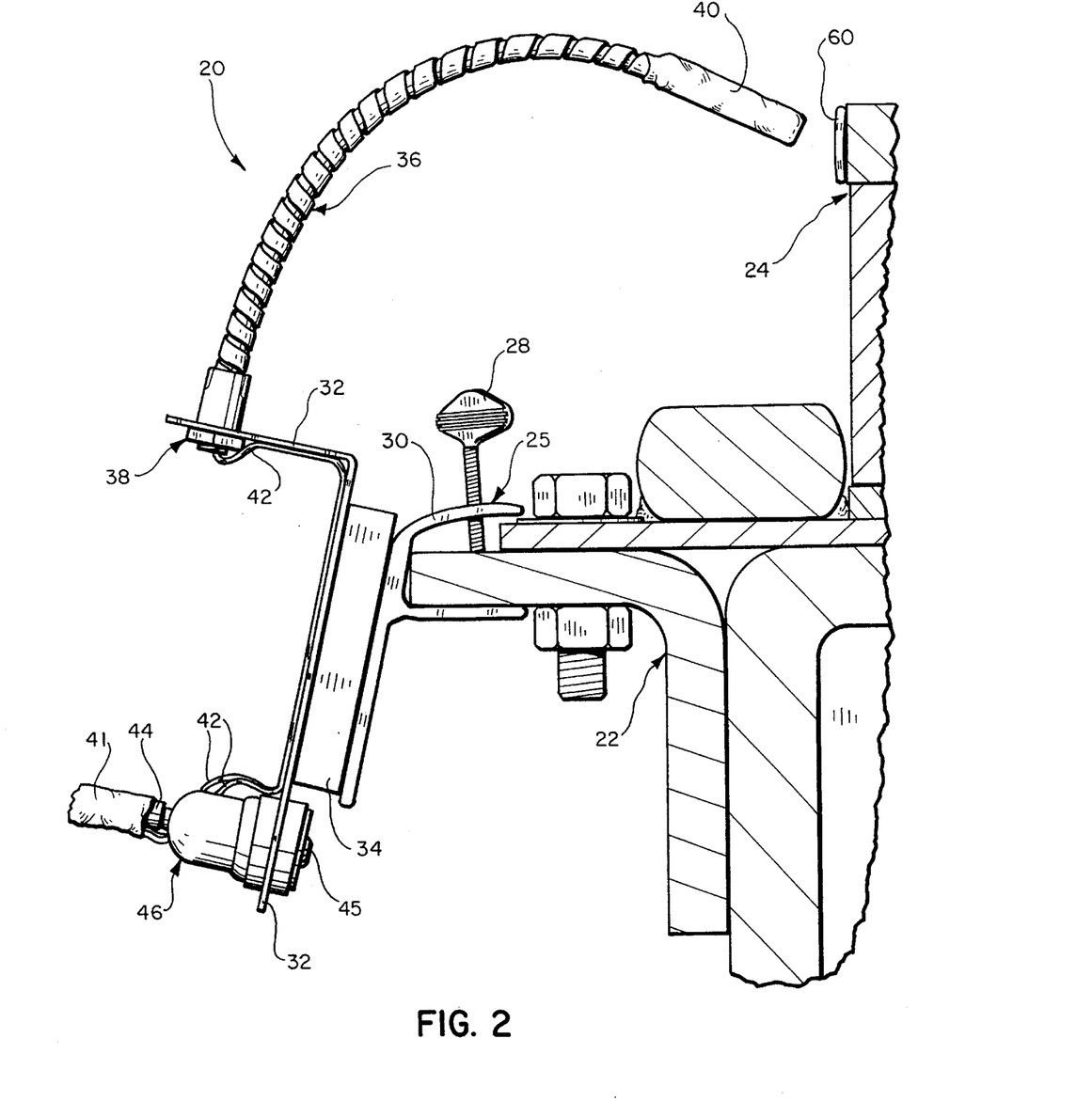
FIG. 2 is an enlarged front elevation view of the position signaling apparatus of FIG. 1.

FIGS. 1 and 2 show a position signaling apparatus 20 mounted to a frame structure 22 of the vehicle. Reference numeral 22 is used to designate generally the frame structure shown in FIGS. 1 and 2. It should be understood, however, that the position signaling apparatus may be attached to any suitable portion of the frame or other structure of the vehicle.

The embodiment of FIGS. 1 and 2 involves a position signaling apparatus 20 for indicating the position of a fifth wheel assembly 24 mounted for relative movement on a carriage assembly 26. Although the fifth wheel assembly 24 shown in FIGS. 1 and 2 involves a typical tractor-trailer vehicle, it is to be understood that the position signaling apparatus of the present invention may be used in connection with any type of vehicle.

The position signaling apparatus 20 comprises a clamp assembly 25 which enables the position signaling apparatus 20 to be attached to almost any frame portion of a vehicle. The clamp assembly more specifically comprises a clamping bolt 28 threadedly received by a C-clamp frame 30. The clamping bolt engages the vehicle frame portion 22 to secure the C-clamp frame 30 in a desired position on the frame 22. The clamp assembly 25 functions in essentially the same manner as a conventional C-clamp.

The position signaling apparatus 20 still further comprises a base member 32 which provides the mounting foundation for the remaining components of the position signaling apparatus. The base member 32 (FIG. 1) is connected to the C-clamp frame 30 by means of a mounting block 34 interposed between the C-clamp frame 30 and the base member 32. In one embodiment, the mounting block comprises a magnet to which the base member and the clamp assembly 25 are magnetically secured. The magnet allows the clamp assembly to be secured first to the vehicle frame 22, after which the remaining components of the position signaling apparatus 20 can be attached to the magnet 34. Alternatively, the block 34 may comprise a metallic or other rigid structure to which the clamp assembly 25 and the base member 32 can be fixedly attached in any conventional manner such as welding, gluing, or the like. In yet another alternative form, the clamp assembly 25 could be directly attached to the base member 32 of the position signaling device without the need of any intermediary structure.

A flexible adjustment arm 36 having a proximal end and a distal end is attached to the base member 32 at its proximal end. The flexible arm 36 includes a convention nut-bolt mounting assembly 38 for mounting through an appropriately sized aperture (not shown) of the base structure 32. A reed or magnet switch 40 is attached to a distal end of the flexible arm 36. The flexible adjustment arm 36 allows the reed switch 40 to be positioned where it will sweep by the magnet 60 (discussed below) to actuate the reed switch. Lead wires 42 operatively couple the reed switch 40 to a power source and a signaling mechanism, such as a light source or audible signal.

The position signaling apparatus further includes a telescopically extendible rod 44 having a first end and a second end. The first end of the rod is secured to a mounting base 32 by means of a pivot/swivel joint 46 mounted within a corresponding aperture (not shown) formed in the base member 32 by means of a conventional fastener 45. The pivot/swivel joint allows the extendable arm 44 to be articulated so that the arm can be positioned to hold the light source 48 (described below) within the visible range of the operator of the vehicle. The rod is extendible to position the light source beyond the vehicles structures, such as tandem wheels. As shown in FIG. 1, the lead wires are advantageously wrapped around the extension arm 44 in a spiralling manner so that when the arm is retracted, the coiled lead wires simply bunch together and do not become entangled. A sleeve member or tape 41 holds the lead wires 42 against the extendible rod 44 adjacent the pivot/swivel joint.

Figure 3:
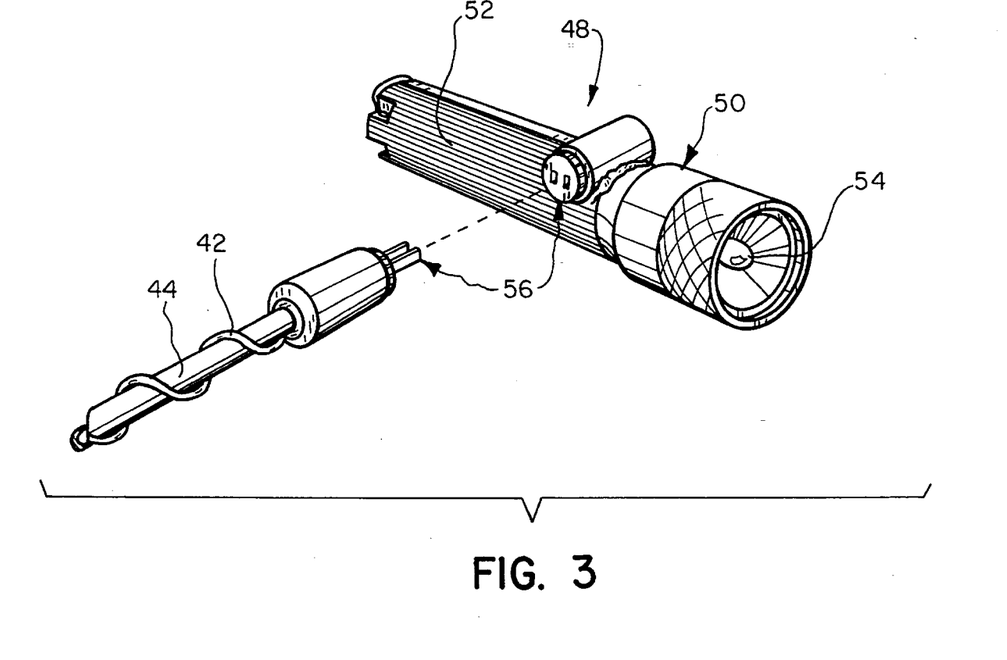
FIG. 3 is an exploded isometric view of the interconnection between a light source and the position signaling apparatus of FIG. 1.
Figure 4:
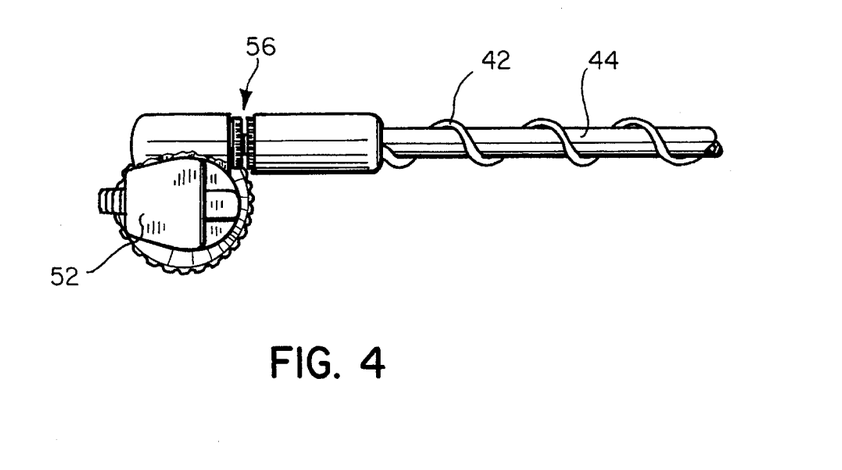
FIG. 4 is a rear elevation view of the light source attached to the position signaling device of FIG. 1.

A signal device 48 (FIG. 1) in the form of a light source, more specifically shown as a flashlight assembly, is attached to the second end of the extension rod 44 to provide a signal to the vehicle operator upon proper positioning of the fifth wheel assembly 24 relative to the carriage 26 and main frame 22 of the vehicle. Referring to FIGS. 3 and 4, the signal device 48 more specifically comprises a detachable reflector/light end assembly 50 coupled to a main housing portion 52. The housing portion 52 is adapted to hold a power source (not shown), such as a conventional battery. A light bulb 54 is mounted within the reflector/light end assembly at an end opposite the main housing portion 52. The bulb 54 is provided to emit a light signal upon actuation of the reed switch 40. A conventional male/female connection 56 allows the signal device 48 to be removably attached to the extendible rod 44 (FIG. 3).

Referring again to FIG. 1, a magnet 60, which acts as a trigger device for the reed switch 40, is mounted to the fifth wheel assembly 24 so as to correspond with the center position of the fifth wheel assembly 24. The flexible adjustment arm 36 is positioned so that the reed switch 40 will sweep past the position of the magnet 60 at the moment when desired alignment or positioning of the fifth wheel assembly has been achieved. Once the reed switch 40 is positioned adjacent the magnet 60, the reed switch is actuated which, in turn, closes the circuit and energizes the light bulb 54.

The fifth wheel assembly 24 is positioned relative to the frame 22 of the vehicle (which is attached, in turn, to the cab portion of the vehicle). The fifth wheel assembly 24 is movable on the carriage 26. Movement is initiated by means of a control mechanism (not shown) inside the cab of a tractor-trailer vehicle. When the fifth wheel must be adjusted to a particular position to adjust the weight distribution on the axles of the vehicle, the driver must enter the cab to actuate a hand-operated control (typically an air valve control) to release the lock that holds the fifth wheel in position relative to the carriage. The tractor, with the trailer attached to the fifth wheel, can be engaged to move the fifth wheel assembly relative to the carriage. Alternatively, a second hand-operated control may be provided inside the vehicle cab to move the fifth wheel in fore and aft directions relative to the cab. Because the driver must remain inside of the cab portion of the vehicle when moving the fifth wheel assembly on the carriage, the operator must guess as to the amount of actual movement of the fifth wheel assembly a given amount of movement of the tractor or duration of actuating the control. After guessing as to the proper amount of movement, the operator must exit the vehicle and observe the actual position of the fifth wheel on the carriage. The operator must then return to the cab to further adjust the position of the fifth wheel, once again guessing as to the proper position. This process continues typically from three to five times before proper positioning can be achieved. Such an adjustment procedure is, of course, time consuming and cumbersome.

With the present invention, on the other hand, the alignment signaling device 20 can be used to enable the vehicle operator to adjust the position of the fifth wheel one time before proper alignment is achieved. Known, desired position is achieved when the reed switch 40 is aligned with the magnet 60, which closes the circuit and energizes the light source or audible signal. After mounting the position signaling device to a portion of the vehicle, the operator is able to enter the cab portion of the vehicle and adjust the position of the fifth wheel assembly quickly and efficiently without leaving the vehicle cab. This eliminates the need to make multiple trips inside and outside of the cab to check positioning of vehicle components. The present invention thus saves time and increases efficiency.

Figure 5:
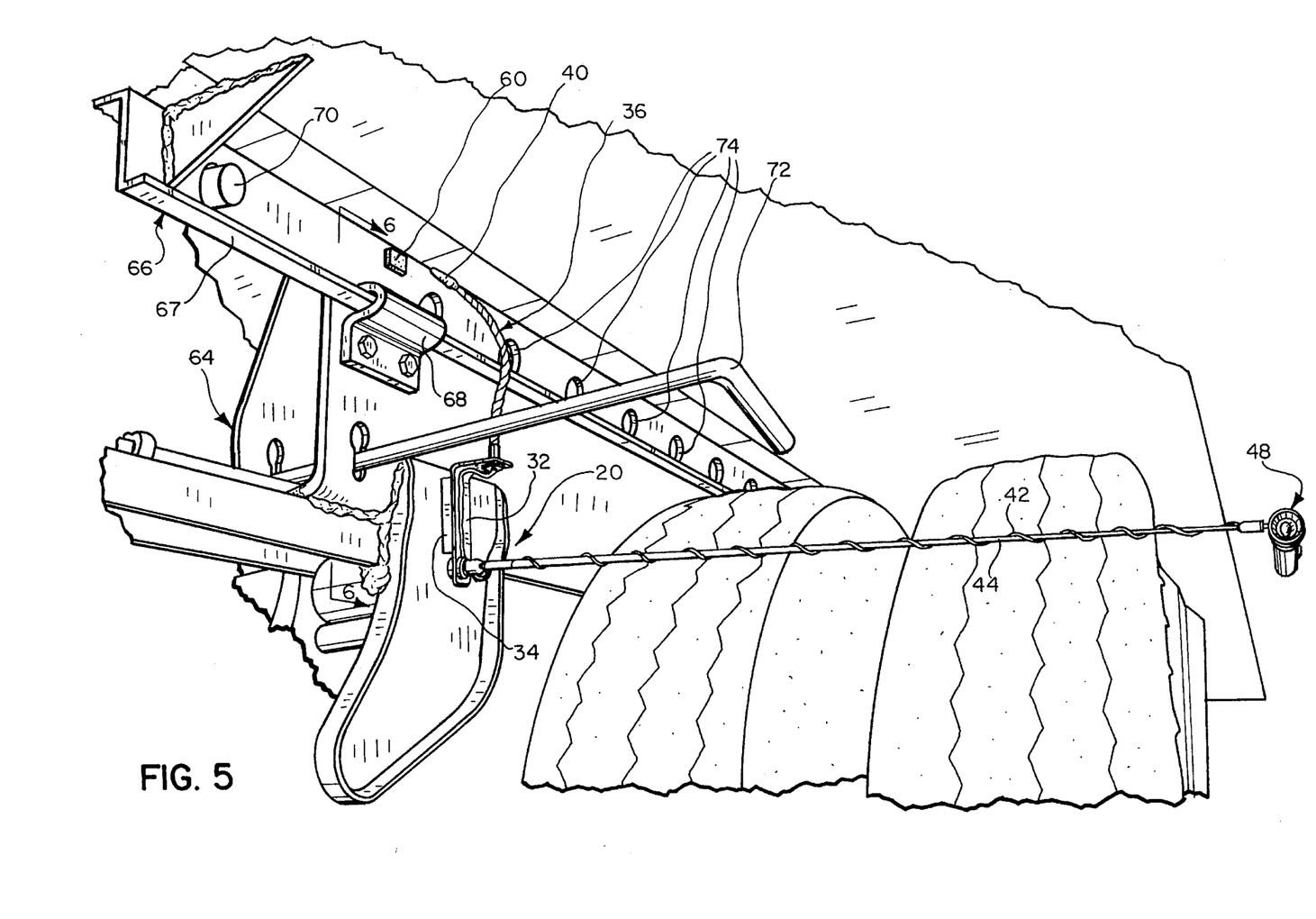
FIG. 5 is an isometric view of the position signaling apparatus according to the present invention mounted for indicating the position of a trailer tandem axle frame assembly relative to a main trailer frame.
Figures 6, 7:
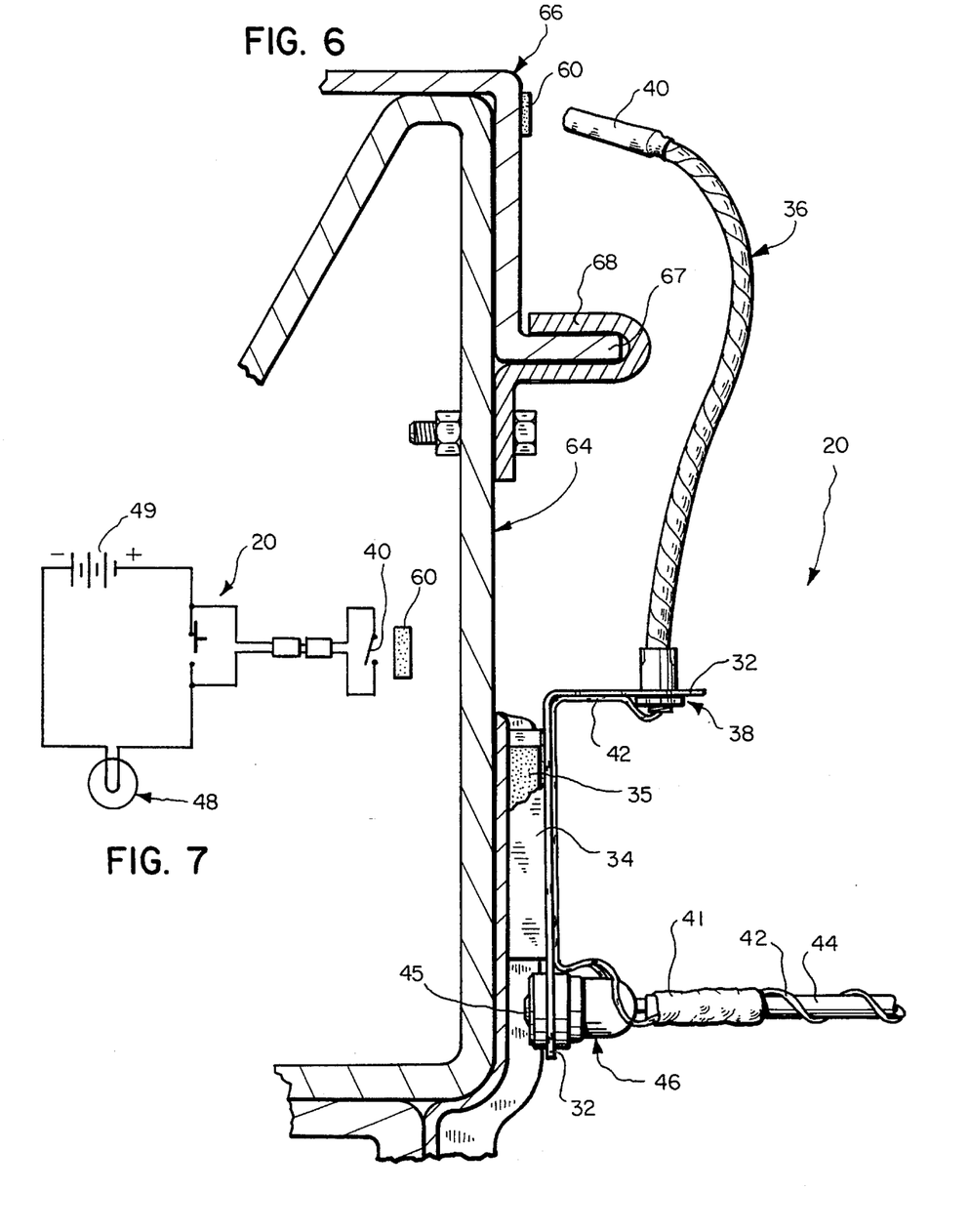
FIG. 6 is a front elevation view of the position signaling apparatus, taken along the line 6—6 of FIG. 5.
FIG. 7 is a detail diagram of an electrical circuit operable in connection with the alignment device of FIGS. 1–6.

FIGS. 5 and 6 illustrate another embodiment of the present invention. The position signaling apparatus 20 is shown secured to a tandem axel frame assembly 64. The tandem axel frame assembly is movable relative to a main trailer frame 66 to adjust the weight distribution among all axels of the vehicle.

The tandem axel frame assembly 64 is mounted for sliding movement relative to the main trailer frame 66. A conventional slide bracket 68 is mounted over a flange 67 extending from the main trailer frame 66. The slide bracket 68 supports the tandem axel frame assembly 64 and allows for sliding relative movement between the tandem axel frame assembly 64 and the main trailer frame 66. A locking pin 70 is selectively operable to lock the trailer frame 66 in position relative to the tandem axle frame assembly 64. A lever 72 is used to move the locking pin 70 between extended and retracted positions by means of a conventional linkage assembly (not shown).

Referring still to FIGS. 5 and 6, the position signaling apparatus 20 generally includes the same elements as shown in connection with FIGS. 1–4, except that the clamp assembly 25 is not utilized. Rather, the position signaling apparatus is mounted directly to the tandem axel frame assembly 64 by means of the magnetic mounting block 34, which connects the base plate 32 to the lower portion of the tandem axel frame assembly 64. The magnetic mounting block allows for rapid mounting and removal of the position signaling apparatus 20. Alternatively, the base plate 32 could be connected to the tandem axel frame assembly 64 by any conventional fastening means.

The flexible arm 36 is adjusted to position the reed switch 40 in a location whereby it necessarily will pass by the trigger magnet 60 mounted to the trailer frame 66 upon movement of the frames 64, 66 relative to one another. A plurality of apertures 74 are provided in the main trailer frame 66 to allow the position of the tandem axel frame assembly to be incrementally adjusted. The magnet 60 is mounted in a position that corresponds with a desired position of the tandem axel frame assembly 64 relative to the main trailer frame 66.

To change the position of the tandem axel frame assembly 64, the lever 72 is actuated to release locking pin 70. After securing the tandem wheels, the operator enters the cab of the vehicle and moves the vehicle such that the trailer frame 66 moves relative to the tandem axel frame 64. As the reed switch 40 passes by the magnet 60, the reed switch 40 is actuated to close an electronic circuit which, in turn, energizes the light source 48. The light source signals the vehicle operator that proper positioning has been accomplished. The vehicle driver can then actuate lever 72 to force the locking pin 70 through one of the apertures 74 to lock the flames 64, 66 in position relative to one another.

A detail diagram of the electrical circuit of the present invention is shown in FIG. 7. As the position sensing device 20 passes by the magnet 60, the switch 40 closes the circuit which allows the power source 49 to supply power to the light assembly 48.

Yet another embodiment of the invention is shown in FIGS. 8–11. A position signaling apparatus 100 is secured to an alternative form of a tandem axel frame assembly 80. The tandem axel frame assembly 80 is mounted for sliding engagement with the main trailer frame 82 by means of a plurality of sliding brackets 84 rigidly mounted to the tandem axel frame assembly 80 and slidably engaging the main trailer frame 82. The trailer frame 82 includes a plurality of apertures 86 for incrementally positioning the trailer frame relative to the tandem axel frame assembly 80. Adjustments of this type are often needed to vary the distribution of weight on the axels. FIGS. 8–11 show a position signaling apparatus 100 comprising a mounting base or platform 102 for attaching the position signaling apparatus to the tandem axel frame assembly 80. The platform 102 may include a magnet, or may be attached directly to the frame assembly 80 in any conventional manner. In the form of a magnet, the base 102 can quickly and easily be positioned on the frame to achieve the desired positioning. A telescopically extendable rod 104 extends outwardly from the base 102 and terminates at a light source 106 attached to the end thereof. Lead wires 108 provide power to the light source. An upstanding arm 110 extends upwardly from the base 102 and includes a reed switch 112 mounted on the end thereof. A power source 114 provides power to the circuit and is connected between the light source 106 and the reed switch 112.

As with the previously discussed embodiment, movement of the trailer frame 82 relative to the tandem axel frame assembly 80 requires the vehicle operator to release a locking pin 88 by actuating a lever of a linkage assembly 90, by which a control rod moves the locking pin 88 into and out of locking position with respect to one of the apertures 86. Thereafter, the vehicle operator will move the vehicle to pull the trailer, including the trailer frame 82, forward or rearward relative to the tandem axel frame 80.

Figure 10:
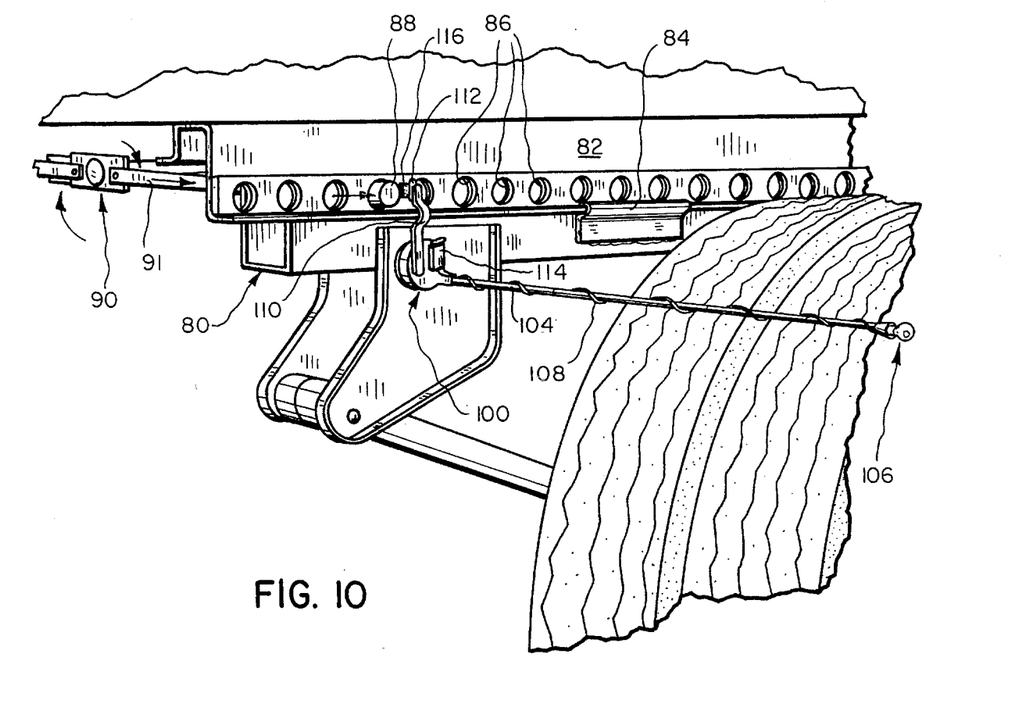
FIG. 10 is an isometric view of the alignment device of FIG. 8 showing a lock mechanism securing in relative position the tandem axle frame assembly and the main trailer frame.
Figure 11:
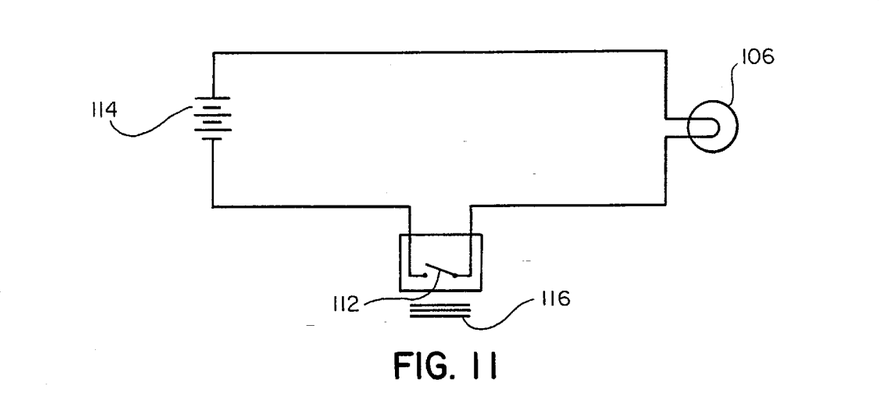
FIG. 11 is a detail diagram of the electrical circuit operable in connection with the alignment device of FIG. 8.

As the trailer frame 82 moves relative to the tandem axel frame 80, the reed switch 112 passes by a magnet trigger mechanism 116 mounted to the trailer frame. The magnet 116 is positioned such that it is aligned with the reed switch 112 when the preferred mounting aperture is aligned with the locking pin 88. At that moment, the magnet closes the reed switch 112 to supply power to the light source 106. This signals to the driver that the desired positioning of the frames 80, 82 relative to one another has been achieved. As shown in FIG. 10, the driver is then able to manually release the locking pin 88 to engage the desired aperture of the trailer frame 82.

Figure 8:
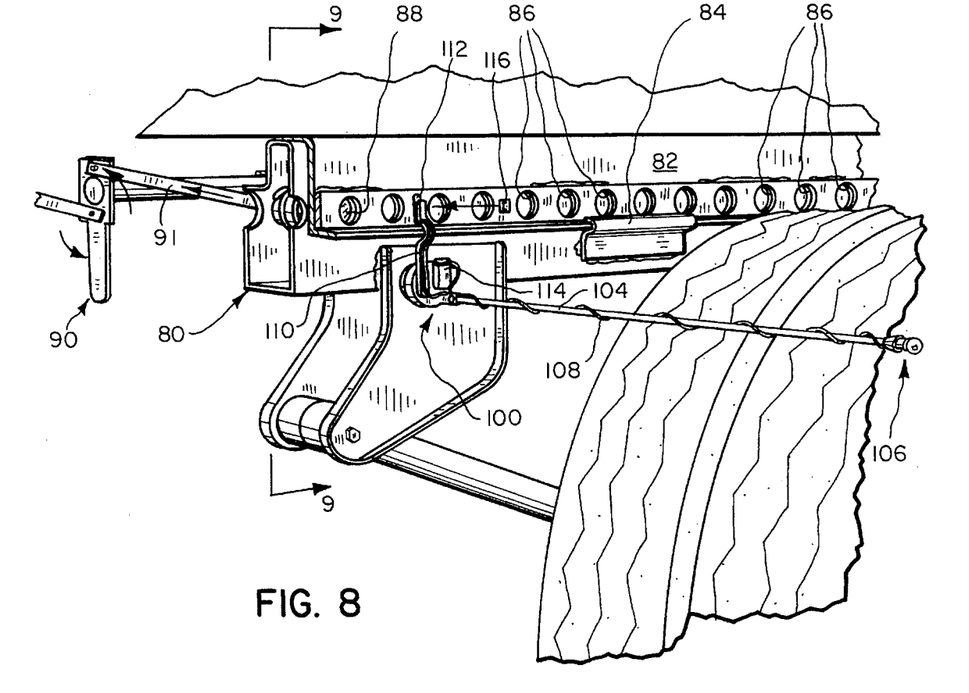
FIG. 8 is an isometric view of an alternative embodiment of the position signaling apparatus for indicating the position of a trailer tandem axle frame assembly relative to a main trailer frame.
Figure 9:
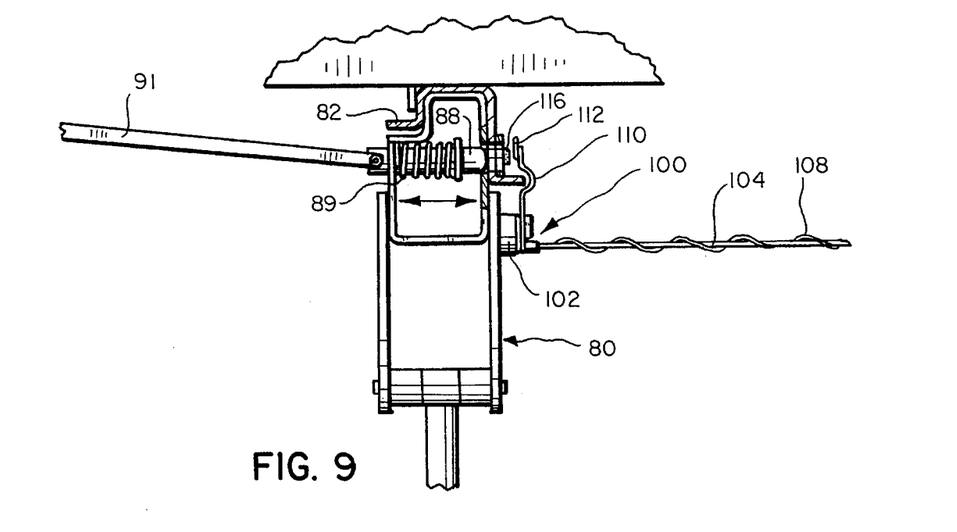
FIG. 9 is a front elevation view of the position signaling apparatus, taken along the line 9—9 of FIG. 8.
Figure 12:
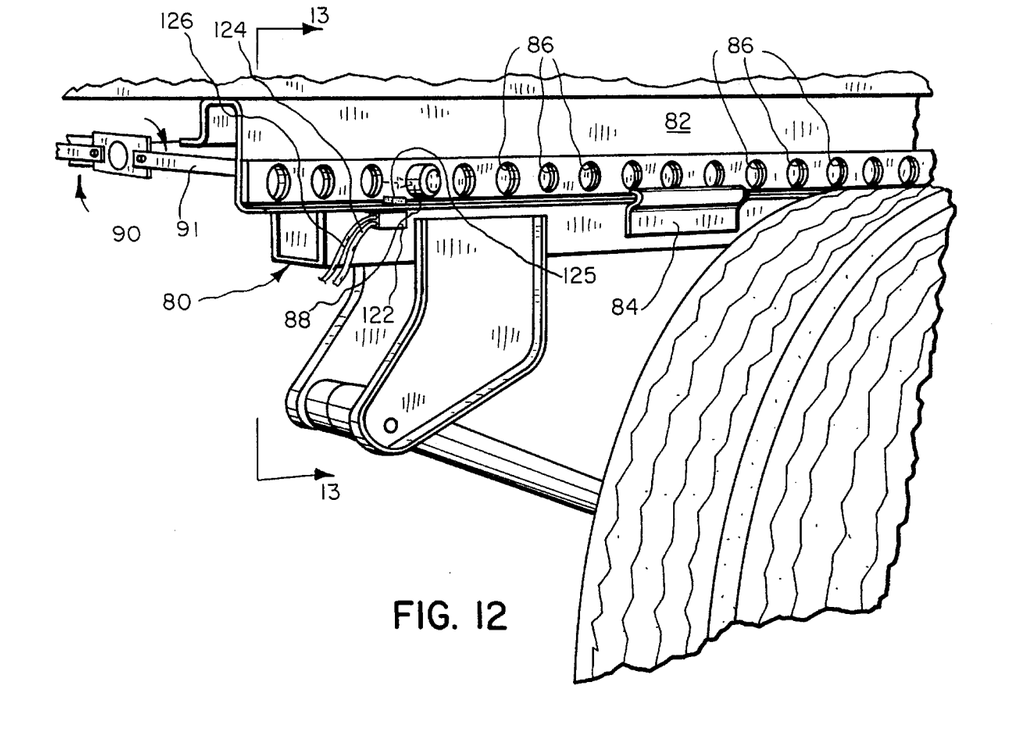
FIG. 12 is an isometric view of yet another alternative embodiment of a position signaling apparatus according to the present invention.
Figure 13:
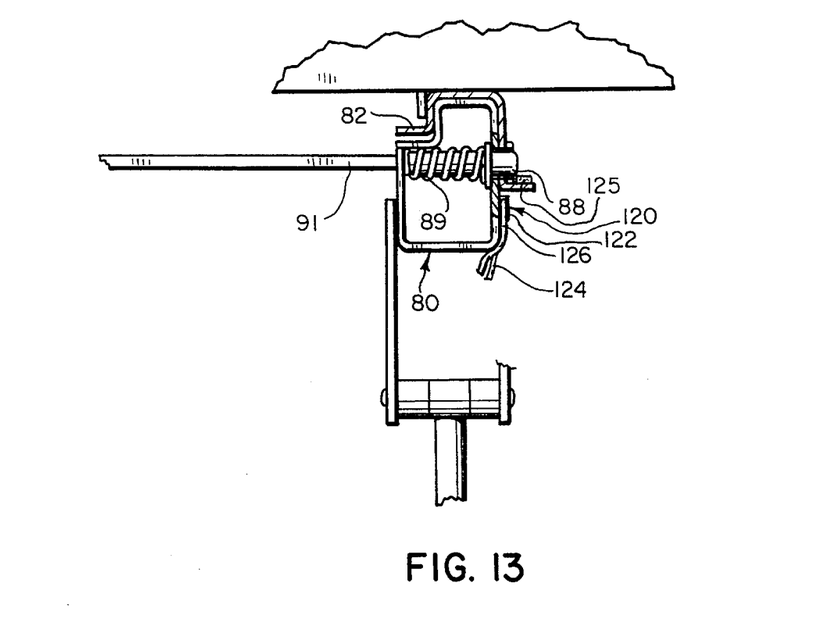
FIG. 13 is a front elevation view of the position signaling apparatus, taken along the line 13—13 of FIG. 12.
Figure 14:
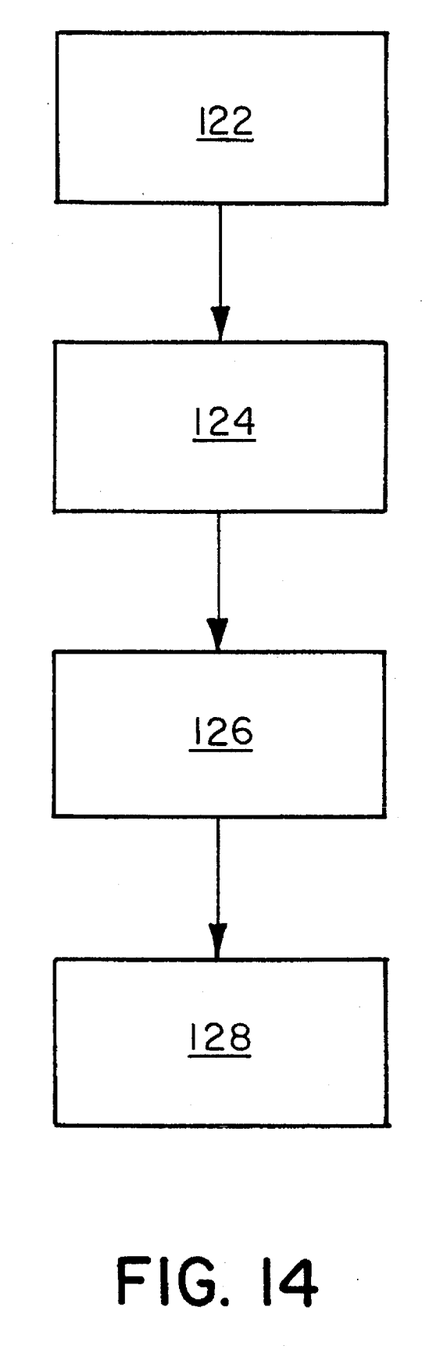
FIG. 14 is a block diagram showing still another alternative embodiment of the position signaling apparatus according to the present invention.

FIGS. 12–14 disclose yet another embodiment of the present invention. FIGS. 12 and 13 show a position signaling or sensing device 120 attached to a tandem axel frame assembly 80. The trailer frame 82 and nested tandem axel frame assembly 80, as well as the lock mechanism 90, are essentially the same as are shown in FIGS. 8–10. The position signaling device 120 comprises a reed switch 122 coupled to a surface of the tandem axel frame assembly 80. A permanent magnet 125 is positioned on the trailer frame 82 adjacent a desire aperture (one of the apertures 86 formed in the trailer frame 82). The lock pin 88 is later inserted through one of the apertures. The magnet 125 actuates the reed switch 122 as the two pass one another to close a circuit, similar to the circuit shown in FIG. 11, and energize a particular signal. Lead wires 124, 126 connect the reed switch 122 to the electrical circuit which provides power to a signal for indicating when the proper position is achieved.

FIG. 14 shows a block diagram showing yet another alternative embodiment of the present invention. When repositioning of the tandem axel arrangement is desired, the nested frames 80, 82 move relative to one another until the switch 122 is actuated. At that point in time, the switch closes a circuit which causes a transmitter 124 to send a signal to a receiver 126. The receiver and transmitter could be any conventional transmitter/receiver combination. When the receiver receives the signal from the transmitter 124, an indicator 128 is energized to signal the driver that the desired position has been achieved. The signal could be audible or visual. Furthermore, the signal may be provided inside the vehicle operator's cab or, alternatively, mounted outside of the cab in a location visible to the driver.

It should be understood that the present invention is not to be limited to tractor-trailer trucks, but may also be used for alignment of any type of trailing device or implement, such as aligning mobile homes, house trailers, motor trailers, and any other type of trailing device requiring a fifth wheel or a ball/socket joint.

In compliance with the statute, the invention has been described in specific language relating to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A position signaling apparatus for providing a signal to a vehicle driver upon achieving a desired positioning of vehicle components, comprising:

a switch coupled to a first vehicle component;

a trigger mechanism to actuate the switch, the trigger mechanism being coupled to a second vehicle component, the first vehicle component being movable relative to the second vehicle component;

a signaling device operatively coupled to the switch to provide a vehicle operator with a signal upon achieving one of a plurality of desired positions of the first vehicle component relative to the second vehicle component;

wherein the first vehicle component comprises a fifth wheel assembly and the second vehicle component comprises a vehicle frame portion adjacent the fifth wheel assembly.

2. A position signaling apparatus for providing a signal to a vehicle driver upon achieving a desired positioning of vehicle components, comprising:

a switch coupled to a first vehicle component;

a trigger mechanism to actuate the switch, the trigger mechanism being coupled to a second vehicle component, the first vehicle component being movable relative to the second vehicle component;

a signaling device operatively coupled to the switch to provide a vehicle operator with a signal upon achieving desired positions of the first vehicle component relative to the second vehicle component;

a flexible arm having a proximal end and a distal end, the flexible arm being secured to the first vehicle frame component at the proximal end, the switch being attached to the distal end of the flexible arm.

3. A position signaling apparatus according to claim 2, further comprising:

a telescoping extension arm having a first end and a second end, the first end being coupled to the proximal end of the flexible arm, a signaling device being attached to the second end.

4. A position signaling apparatus for providing a signal to a vehicle driver upon achieving a desired positioning of vehicle components, comprising:

a switch coupled to a first vehicle component;

a trigger mechanism to actuate the switch, the trigger mechanism being coupled to a second vehicle component, the first vehicle component being movable relative to the second vehicle component;

a signaling device operatively coupled to the switch to provide a vehicle operator with a signal upon achieving one of a plurality of desired positions of the first vehicle component relative to the second vehicle component;

wherein the first vehicle component comprises a tandem axel frame assembly and the second vehicle component comprises a trailer frame assembly.

5. A position signaling apparatus for providing a signal to a vehicle driver upon achieving a desired positioning of vehicle components, comprising:

a switch coupled to a first vehicle component;

a trigger mechanism to actuate the switch, the trigger mechanism being coupled to a second vehicle component, the first vehicle component being movable relative to the second vehicle component;

a signaling device operatively coupled to the switch to provide a vehicle operator with a signal upon achieving desired positions of the first vehicle component relative to the second vehicle component;

wherein the first vehicle component comprises a tandem axel frame assembly and the second vehicle component comprises a trailer frame assembly;

a flexible arm having a proximal end and a distal end, the flexible arm being secured to the tandem axel frame assembly at the proximal end, the switch being attached to the distal end of the flexible arm.

6. A position signaling apparatus according to claim 5, further comprising:

a telescoping extension arm having a first end and a second end, the first end being coupled to the proximal end of the flexible arm, a signaling device being attached to the second end.

7. A position signaling apparatus for providing a signal to a vehicle driver upon achieving a desired positioning of vehicle components, comprising:

a switch coupled to a first vehicle component;

a trigger mechanism to actuate the switch, the trigger mechanism being coupled to a second vehicle component, the first vehicle component being movable relative to the second vehicle component;

a signaling device operatively coupled to the switch to provide a vehicle operator with a signal upon achieving desired positions of the first vehicle component relative to the second vehicle component;

wherein the first vehicle component comprises a tandem axel frame assembly and the second vehicle component comprises a trailer frame assembly;

wherein the tandem axel frame assembly includes a plurality of mounting apertures and the trailer frame includes a primary mounting aperture, and further comprising a locking pin insertable through the primary mounting aperture and one of the plurality of mounting apertures to secure the tandem axel frame assembly in position relative to the trailer frame.

8. A position signaling apparatus for indicating relative positioning of components of a vehicle, comprising:

a mounting base attachable to a first component of a vehicle;

a flexible adjustment arm having a proximal end and a distal end, the proximal end being attached to the mounting base;

a switch attached to the distal end of the flexible adjustment arm;

a trigger mechanism coupled to a second component of a vehicle, the trigger mechanism actuating the switch upon desired positioning of the first and second vehicle components;

a telescopically extendable rod having a first end and a second end, the first end being attached to the mounting base;

a signaling device attached to the second end of the extendable rod and operatively coupled to the switch, the signaling device sending a message to a vehicle operator upon actuation of the switch to indicate desired positioning of the first and second vehicle components relative to one another.

9. A position signaling apparatus according to claim 8, further comprising a pivot/swivel joint connected between the first end of the extendable rod and the mounting base, the pivot swivel joint enabling the extendable rod and signaling device attached thereto to be articulated so that the signaling device can be observed by a vehicle operator while inside the cab portion of a vehicle.

10. A position signaling apparatus according to claim 8 wherein the switch comprises a reed switch.

11. A position signaling apparatus according to claim 8 wherein the switch comprises a reed switch and the trigger device comprises a magnet.

12. A position signaling apparatus according to claim 8 wherein the first vehicle component comprises a tandem axel frame assembly.

13. A position signaling apparatus according to claim 8 wherein the first vehicle component comprises a tandem axel frame assembly and the second vehicle component comprises a trailer frame.

14. A position signaling apparatus according to claim 8 wherein the first vehicle component comprises a trailer frame.

15. A position signaling apparatus according to claim 8 wherein the first vehicle component comprises a trailer frame and the second vehicle component comprises a locking pin insertable through the trailer frame.

16. A position signaling apparatus according to claim 8 wherein the first vehicle component comprises a fifth wheel assembly.

17. A position signaling apparatus according to claim 8 wherein the first vehicle component comprises a fifth wheel assembly and the second vehicle component comprises a vehicle frame portion adjacent the fifth wheel assembly.

18. A position signaling apparatus according to claim 8 wherein the signaling device comprises a light source.

19. A position signaling apparatus according to claim 8 wherein the signaling device comprises a light source located inside a cab portion of the vehicle.

20. A position signaling apparatus according to claim 8 wherein the signaling device comprises an audible signal located inside a cab portion of a vehicle.

* * * * *